United States Patent [19]
Riel et al.

[11] Patent Number: 5,041,526
[45] Date of Patent: Aug. 20, 1991

[54] DIMER FOR SYNTHESIS OF HIGH PERFORMANCE POLYMER MATRIX COMPOSITES

[75] Inventors: Frank J. Riel, San Diego; Tuyet Vuong, Elsinore; Edward A. Delaney, Spring Valley, all of Calif.

[73] Assignee: Rohr Industries, Inc., Chula Vista, Calif.

[21] Appl. No.: 515,079

[22] Filed: Apr. 26, 1990

Related U.S. Application Data

[63] Continuation-in-part of Ser. No. 194,321, May 10, 1988.

[51] Int. Cl.$^5$ .................. C08G 8/02; C08G 69/26
[52] U.S. Cl. .................. 528/353; 528/125; 528/128
[58] Field of Search .................. 528/353, 125, 128

[56] References Cited

U.S. PATENT DOCUMENTS 3,708,459 1/1973 Lubowitz .................. 528/353

OTHER PUBLICATIONS

Chemical & Engineering News; "Advanced Polymer Composites Tailored For Aerospace Use", pp. 37–57; Jul. 23, 1990.

35th International SAMPE Symposium, "A New PMR Addition Polyimide Having Improved Toxicity, Outlife and Processing Properties"; R. B. Baggett et al.; Apr. 2–5, 1990.

Federal Register, vol. 54, No. 91, 20715–20744 (May 12, 1989), Occupational Exposure to 4,4'Methylenedianiline (MDA); Proposed Rule.

National Institute for Occupational Safety and Health, Current Intelligence Bulletin 47 (Jul. 25, 1986), Publication No. 86-115.

National Toxicology Program Technical Report No. 360, Toxicology & Carcinogenesis Studies of N,N-Dimethylaniline.

Primary Examiner—Morton Foelak
Assistant Examiner—P. Hampton Hightower
Attorney, Agent, or Firm—Patrick J. Schlesinger

[57] ABSTRACT

An improved synthesis for PMR-type polyimides, including first preparing a dimer of 5-norbornene-2,3-dicarboxylic acid, or acid ester or anhydride and 4,4'methylene dianiline. This dimer is then reacted with one of the following:

1. the reaction product of a primary aromatic diamine and an aromatic dianhydride.
2. an aromatic dianhydride.
3. a mixture of a primary aromatic diamine and an aromatic dianhydride, or an ester of an aromatic tetraacid or an aromatic tetraacid.

The resulting polyimide prepolymer exhibits superior physical properties and is substantially free of undesired impurities and unreacted 4,4'-methylene dianiline.

134 Claims, 1 Drawing Sheet

TRIMER FORMATION AS A FUNCTION OF MOLE RATIOS, MDA/NA

| MOLE RATIO MD/NA | HPLC ANALYSIS, AREA PERCENT OF EACH COMPONENT | | | | | | |
|---|---|---|---|---|---|---|---|
| | MDA 5 * | NA-MDA 15 | NI-MDA 20 | NA-MDA-NA 45 | NA-MDA-NI 55 | NI-MDA-NI 65 | TRIMER TOTAL |
| 4/1 | 44.6 | 5.4 | 33.5 | — | 0.1 | 2.5 | 2.6 |
| 3/1 | 51.1 | 4.8 | 36.5 | — | 0.8 | 3.7 | 4.5 |
| 2/1 | 34.9 | 2.9 | 49.1 | — | 0.6 | 8.8 | 9.4 |
| 1.05/1 | 16.5 | 1.9 | 42.5 | — | 8.9 | 15.2 | 24.1 |
| 0.95/1 | 15.4 | 3.1 | 48.5 | — | 6.1 | 23.1 | 29.2 |
| 0.66/1 | 1.8 | 15.6 | 3.2 | 40.7 | 19.2 | 11.6 | 71.5 |
| 0.50/1 | 2.4 | 24.8 | 2.7 | 51.4 | 12.8 | 2.5 | 66.7 |

* = ELUTION TIME, HPLC ANALYSIS

TRIMER FORMATION AS A FUNCTION OF MOLE RATIOS, MDA/NA

HPLC ANALYSIS, AREA PERCENT OF EACH COMPONENT

| MOLE RATIO MD/NA | MDA 5 * | NA-MDA 15 | NI-MDA 20 | NA-MDA-NA 45 | NA-MDA-NI 55 | NI-MDA-NI 65 | TRIMER TOTAL |
|---|---|---|---|---|---|---|---|
| 4/1 | 44.6 | 5.4 | 33.5 | — | 0.1 | 2.5 | 2.6 |
| 3/1 | 51.1 | 4.8 | 36.5 | — | 0.8 | 3.7 | 4.5 |
| 2/1 | 34.9 | 2.9 | 49.1 | — | 0.6 | 8.8 | 9.4 |
| 1.05/1 | 16.5 | 1.9 | 42.5 | — | 8.9 | 15.2 | 24.1 |
| 0.95/1 | 15.4 | 3.1 | 48.5 | 40.7 | 6.1 | 23.1 | 29.2 |
| 0.66/1 | 1.8 | 15.6 | 3.2 | 40.7 | 19.2 | 11.6 | 71.5 |
| 0.50/1 | 2.4 | 24.8 | 2.7 | 51.4 | 12.8 | 2.5 | 66.7 |

\* = ELUTION TIME, HPLC ANALYSIS

DIMER FOR SYNTHESIS OF HIGH PERFORMANCE POLYMER MATRIX COMPOSITES

CROSS-REFERENCE TO RELATED APPLICATIONS

This application is a continuation-in-part of application Ser. No. 07/194,321 filed May 10, 1988, and is related to application Ser. No. 07/385,659 filed July 25, 1989 which is a continuation-in-part of application Ser. No. 07/194,321.

FIELD OF INVENTION

An improved synthesis for a class of high temperature polyimides known as PMR, useful in the production of high performance polymer matrix composites.

TECHNOLOGY REVIEW

The application of polymer matrix composite materials was expanded by the development of a class of polyimides known as PMR, for in situ Polymerization of Monomer Reactants. Polymer matrix composite materials may be produced from PMR polyimides by impregnating the reinforcing fibers with a solution containing a mixture of monomers dissolved in a low boiling point solvent. The monomers are essentially unreactive at room temperature, but react in solution at elevated temperatures to form a high temperature stable polyimide matrix. The preparation of PMR polyimides is described in U.S. Pat. No. 3,745,149 by T. Serafini, et al.

Four thermal transitions occur during the overall cure of a PMR polyimide. The first and third transitions are endothermic and are related to the following: (1) melting of the monomer reactant mixture below 100° C., (2) in situ reaction of the monomers at about 140° C., and (3) melting of the norbornene terminated prepolymers in the range of 175° to 250° C. The second transition (above) and the fourth transition, centered near 340° C., are exothermic. The fourth transition is related to the addition cross-linking reaction.

In the field of advanced composites, the aerospace industry is in great need of an advanced composite that can withstand elevated temperatures while retaining the desired mechanical properties. One such material that has attracted attention is the polyimide PMR-15, but it is beset with difficulties that have precluded its widespread acceptance. PMR-15 consists of a methanol solution of the monomethyl ester of 5-norbornene-2,3-dicarboxylic acid (NE), the dimethyl ester of 3,3',4,4'-benzophenonetetracarboxylic acid (BTDE), and 4,4'-methylenedianiline (MDA).

The difficulties with PMR-15 are well-documented in the literature. It was reported in 1985 that aged PMR-15 resin solutions have poor physical properties, especially high temperature aging characteristics. See Lindenmeyer, et al. *Characterization of PMR Polyimide Resin and Prepreg* (NASA Contractor Report, NASA CR-168217). These authors report that their investigation has shown that PMR-15 resin solutions may be characterized by HPLC methods, and that final composite properties depend primary upon the amount of unreacted NE present in the prepreg prior to cure. At relatively low temperatures the NE and MDA appear to undergo a reaction that adversely affects the physical properties (especially the high temperature aging characteristics) of the resulting composites. The most likely reaction products of such a combination, the mono and bisimide, could not be confirmed as existing in the aged prepregs by these authors. Furthermore, the authors report that the deliberate addition of one of these materials, the monoimide, did not produce the same adverse effects on the aging characteristics. Kranbuehl et al., *Dynamic Dielectric Analysis of the Cure Chemistry of PMR-15*, Polyimides (1985), notes that the reproducibility in both the processing and final properties of this resin have been very poor.

MDA, the amine component of PMR-15, is a known human carcinogen. In a Federal Register notice published May 12th, 1989 at 54 Fed. Reg. 20672, the Occupational Safety and Health Administration (OHSA) proposed a maximum permissible exposure limit of 10 parts of MDA per billion parts of air (10 ppb) averaged over an eight-hour day, plus a 100 ppb short term exposure limit over a 15-minute period. The current maximum permissible exposure for MDA is 100 ppb. Based on estimates of cancer risk the new standards are expected to prevent from about 2 to about 23 cancer deaths per year, and to reduce liver damage. General industry support for the OSHA proposal to lower permitted MDA exposure is reported in Advanced Composites, page 20, July/August 1989.

When the proper precautions are taken in dealing with MDA, e.g., respirators, gloves, air flow, all of which also involve a certain mental strain for a worker in knowing he is handling a hazardous material, it is difficult for the worker to make products having the desired quality in a timely manner without undue scrap. The increase in quality and productivity made possible by the use of a PMR-15 prepreg that is MDA free is another highly desirable goal. This "prepreg" is a carbon cloth material that has been impregnated with the resin. The prepreg is then cured according to a predetermined time and pressure cycle to complete the cure cycle.

Wilson, *PMR-15 Processing, Properties and Problems—A Review*, British Polymer J. 20, 405-416 (1988) reports the health and safety considerations of MDA containing PMR-15, and that no other amine that was tried offered the same combination of properties as MDA. MDA is considered so dangerous that its sale in Europe is restricted.

U.S. Pat. No. 3,697,345 to Vaughan et al. discloses an uncontrolled blending of a diamine, nadic monoanhydride and a dianhydride in no preferred order or reaction conditions. The polyamic-acid precursor or precursor of a polyimide prepolymer product is of uncontrolled composition and purity, and is subject to variation resulting from different mixing procedures, storage, and preparation of fiber reinforced prepreg materials.

U.S. Pat. No. 3,708,459 to Lubowitz is directed to molding applications and discloses an uncontrolled first reaction of diamine and the monofunctional anhydride (NA), followed by the addition of the difunctional dianhydride. The reaction conditions are uncontrolled and no steps are taken to limit the formation of undesired by-products or to control product purity or molecular weight distribution.

The problems to overcome are twofold. First, there is a problem of substantially eliminating free MDA from the polyamic acid as it is used in the prepreg, the PMR-15 in the cured state being generally the same in both instances. Second, there is a problem of suppressing the trimer (NE-MDA-NE) formation in the condensation prepolymer since this causes processing difficulties resulting from increased molecular weight and a wider molecular weight distribution. The higher molecular weight fractions decrease flow during the curing process, thus complicating the release of reaction volatiles.

An improved synthesis for polyimides has now been discovered, which significantly improves the physical properties and uniformity of PMR matrix composite materials. There are unexpected enhancements in storage stability, processability and performance. The suppression of trimer formation resulting in a more clearly controlled molecular weight distribution, and the ability to produce an MDA-free resin system are additional advantages.

SUMMARY OF THE INVENTION

The present invention provides an improved synthesis for high temperature polyimides known as PMR. The synthesis of the present invention may be used, for example, to prepare an improved PMR-15 polyimide. The chemistry of the PMR-15 condensation reaction has in the past been generally represented by the following equations. These equations are not intended to imply separate interactions between the three ingredients, which may interact simultaneously. The abbreviations used in the equations are now more fully described. As used herein, nadic refers to 5-norbornene-2,3-dicarboxylic compounds. For example, nadic acid refers to 5-norbornene-2,3-dicarboxylic acid and nadic ester (NE) refers to the monomethyl ester of 5-norbornene-2,3-dicarboxylic acid.

NA = Anhydride of 5-norbornene-2,3-dicarboxylic acid

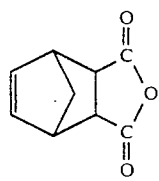

NE = Monomethyl Ester of 5-norbornene-2,3-dicarboxylic acid

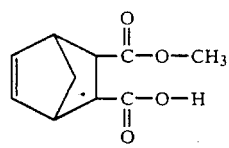

MDA = Methylene Dianiline

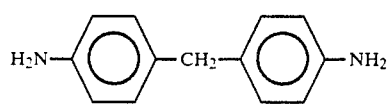

BTDE = Benzophenone Tetracarboxylic Acid, Dimethyl Ester

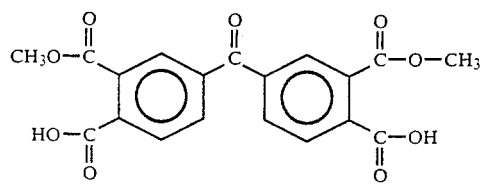

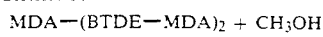

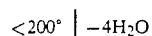

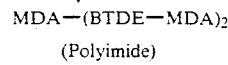

(Polyimide)

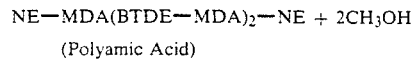

(Polyamic Acid)

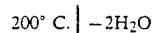

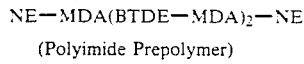

(Polyimide Prepolymer)

It has now been discovered that the above-described chemistry is not correct. Surprisingly, it has been discovered that a small amount of the volatiles (water and methanol) are released in the temperature range of about 200° to 315° C. even though the condensation reaction should be complete at 200° C. It is this release of volatiles at or near the cross-linking temperature that causes processing problems during cure and/or postcure. The source of these high temperature volatiles has now been identified, and an improved synthesis to avoid their formation is described below.

BRIEF DESCRIPTION OF THE DRAWING

FIG. 1 indicates the results of a series of experiments to determine the influence of mole ratios, MDA to NA, on the level of trimer formation. A mole ratio range of 4-1 (MDA excess) to 0.5-1 (MDA deficiency) was investigated. The relative amounts of each component were estimated by comparison of the respective area percents under each peak. FIG. 1 indicates that a 1.05 to 1.00 mole ratio of MDA to NA renders an unacceptable trimer formation, and that to significantly suppress trimer formation at least about a 2 to 1 ratio must be reached.

DETAILED DESCRIPTION OF THE INVENTION

A correct description of chemistry of the preparation of high temperature PMR polyimides is now presented. The above description approximately defines the beginning and end of the condensation reaction. A more accurate reaction sequence is set forth below.

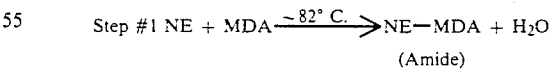

(Amide)

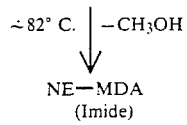

NE—MDA
(Imide)

This reaction occurs over a wide temperature range, from about −20° C. to over 82° C.

Step #2

-continued

(Amide)

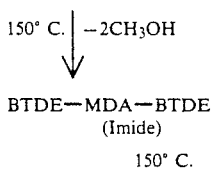

BTDE—MDA—BTDE
(Imide)

150° C.

Step #3 2NE—MDA + BTDE—MDA—BTDE⟶

NE—MDA(BTDE—MDA)$_2$—NE + 2H$_2$O
(Amide)

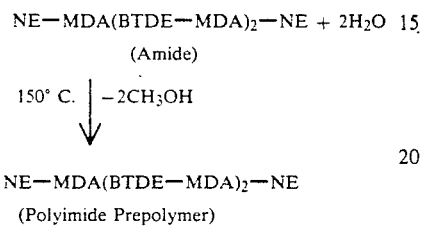

NE—MDA(BTDE—MDA)$_2$—NE
(Polyimide Prepolymer)

The reaction sequence set forth above more correctly reflects the chemical reactions. Neither this sequence, nor the one previously described, accounts for the fact that a small amount (about 2 to 3%) of volatile components (water and methanol) are released in the temperature range from 200° to 315° C. even though the condensation reactions should be complete at 200° C. It has now been discovered that it is this release of volatiles near or at the cross-linking temperature that causes problems during cure and/or postcure.

In the second reaction sequence, it is seen that in the first step the amine (methylene dianiline) reacts with the nadic ester (the monomethyl ester of 5-norbornene-2,3-l-dicarboxylic acid).

A secondary reaction has been discovered in addition to:

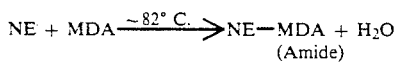

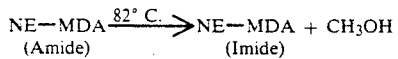

This secondary reaction may be represented as taking place in a three step sequence, as follows:

2NE+1 MDA→NE-MDA-NE (Diamide)+2H$_2$O

NE-MDA-NE (Diamide)→NE-MDA-NE
(Amide-Imide)+1 CH$_3$OH

NE-MDA-NE (Amide-Imide)→NE-MDA-NE
(Diimide)+1 CH$_3$OH

The concentration of this secondary product is low in fresh prepolymer, but gradually increases with time. It has been found that typical times for significant buildup of this product in polyimide prepolymer are:
- −18° C.—about 2 years
- 4° C.—about 1 year
- 20° C.—about 30 days
- 82° C.—about 10 minutes While not wishing to be bound by any theory, it is believed that there are three basic reasons why the presence of increasing concentrations of NE-MDA-NE trimer result in increasing processing problems and probable degradation of physical properties of the cured resin. They are:

1. NE-MDA-NE is converted, at the crosslinking temperature (288° C.) to a BMI-type resin, and remains as an adulterant in the cured system. The brittle characteristics of the BMI-type systems are well documented.

2. Since NE-MDA-NE formation is an irreversible reaction, its formation consumes MDA which otherwise would be used to form the molecule needed to produce the desired molecular weight of 1500. This loss of MDA reduces the mole ratio of MDA/BTDE from the desired value of 3.087/2.087 to a lower value, hence increasing the molecular weight. (a 1/1 mole ratio will result in an indefinite molecular weight). Increased molecular weight reduces flow in the intermediate temperature range, thus complicating the timely expulsion of volatile materials.

3. The irreversible consumption of NE removes from the system the end cap units which control molecular weight build up and also are essential to the proper crosslinking reaction. Also, lack of end cap units can result in unendcapped BTDE-MDA units, which will continue to cure by a condensation reaction, with the continued release of methanol and water.

It is an important aspect of the present invention to carry out, prior to resin formulation, a reaction between the nadic compound such as NE and the primary aromatic diamine such as MDA to form the desired dimer such as NE-MDA dimer and to suppress formation of the undesired trimer such as NE-MDA-NE trimer. In the practice of the present invention it is advantageous to purify dimer such as the NE-MDA dimer produced by the reaction of NE and MDA to remove NE-MDA-NE trimer. In order to suppress trimer formation, an excess of the MDA should be used, and the NE should be added slowly to the MDA, to maintain a large excess of MDA. When the reaction is complete, the product is purified by suspension in hot 1N hydrochloric acid, and hot filtration. The trimer is insoluble, because it does not have a free amine group, and is removed by filtration of the hot suspension. The free amine group on the desired product, NE-MDA, is in the form of the hydrochloride salt, which is soluble in hot hydrochloric acid, but crystallizes out on cooling to room temperature. The excess MDA forms a dihydrochloride salt, which is soluble in cold hydrochloric acid. The desired product is filtered off from the cooled down filtrate, washed to remove excess MDA, suspended in water, and treated with dilute alkali (sodium hydroxide, sodium carbonate, etc.) to convert to the free amine. The excess MDA can be recovered by treatment of the cold filtrate with alkali, which regenerates the free base.

The amount of excess primary aromatic diamine such as MDA used depends on an economic trade-off of how much trimer must be discarded compared to the cost of recovering reusing the excess primary aromatic diamine such as MDA. Excess primary aromatic diamine such as MDA may be in an amount sufficient to suppress trimer formation. Preferably, at least about 100% excess primary aromatic diamine such as MDA with respect to the nadic compound may be used. 400% excess primary aromatic diamine such as MDA may be used. Excess primary aromatic diamine such as MDA is calculated as a molar ratio between primary aromatic diamine such as MDA and the nadic compound.

Another important aspect of this invention is that the second step of the reaction sequence, the synthesis of the corresponding BTDE-MDA and BTDE-MDA-BTDE imide products, present unexpected characteristics not shared by the NE-MDA material. Both the dimer and trimer imides have been synthesized, but their high melting points and limited solubility in ordinary solvents render them difficult to use for resin formulation. In order to resolve this problem it has been discovered that stopping the synthetic procedure at its first stage, that is the amic acid configuration shown below

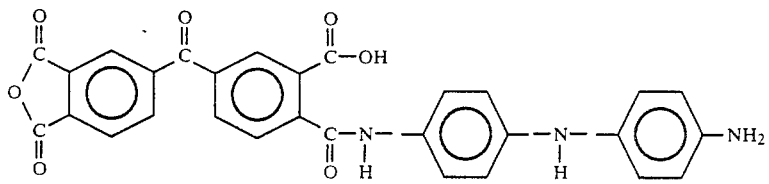

enhances solubility, and reduces the melting points, hence makes the product more amenable to resin formulation.

A second consideration, for this portion of the process of the present invention, is that unlike the NE-MDA synthesis the bis adduct (trimer) is not an undesirable byproduct, but is a desired step in the sequential build-up of the desired polymer chain. Hence, the most direct procedure is to carry out the reaction as follows: 4 BTDA+2 MDA→BTDA-MDA-BTDA+BTDA-MDA+BTDA. The exact ratio of reaction products has not been determined. However, it is believed that the trimer is the main product. From a resin formulation standpoint, the trimer is the most desired product.

A complete reaction sequence is set forth below.

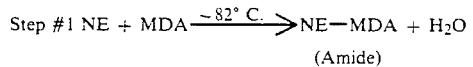

(Amide)

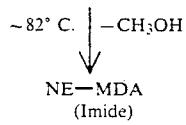

NE—MDA
(Imide)

This reaction occurs over a wide temperature range, from about −20° C. to over 82° C.

Step #2 4BTDA + 2MDA ⟶

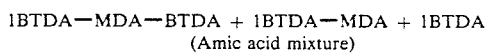
(Amic acid mixture)

Step #3

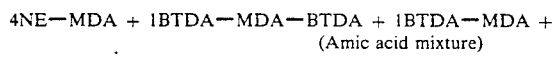
(Amic acid mixture)

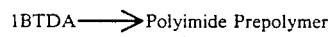

As used herein an amic acid mixture refers to a mixture of the reaction products of a primary aromatic diamine (such as MDA)+an aromatic compound selected from the group consisting of an aromatic dianhydride, a diester of an aromatic tetraacid and an aromatic tetraacid (such as BTDA), (for example, BTDA-MDA dimer +BTDA-MDA BTDA trimer) both in the amic acid form as shown in the above configuration, plus any unreacted aromatic compound selected from the group consisting of an aromatic dianhydride, a diester of an aromatic tetraacid and an aromatic tetraacid (such as unreacted BTDA). Such a product will be soluble in dilute alkaline solutions, and certain organic solutions, such as THF, NMP, etc.

The reaction of BTDA and MDA proceeds easily. While a number of reaction conditions of solids, solvents and temperatures are possible, the preferred conditions are:

Solids—about 10 to 25% by weight
Solvents—THF, DMAC, NMP

As used herein THF is an abbreviation for tetrahydrofuran (also called oxacyclopentane), DMAC is an abbreviation for dimethylacetamide, and NMP is an abbreviation for N-methyl pyrrolidone.

| | |
|---|---|
| Temperature | about 0° C. to 75° C. with the upper limit set below that at which imidization occurs. The temperature at which imidization occurs will depend on the particular system, type and amount of solvent, and the time of exposure. Since imidization leads to insolubility, the amount of imide present must be controlled. |
| Reactant Ratio | BTDA/MDA = about 2/1 |

The reaction is carried out in a one liter resin kettle equipped with mechanical agitation, thermometer and temperature control, dropping funnel, nitrogen purge, and reflux condenser. An ice bath was used to regulate temperature in the initial phases of the reaction to control an exotherm. An I²R controller was used to control temperatures above room temperature.

The reaction of BTDA and MDA is carried out as follows:

1. One mole of a solution of MDA in a suitable solvent is slowly added to two moles of BTDA (anhydride), in a suitable solvent. The reaction mixture is cooled, to compensate for the mild exotherm.

2. After addition is complete, the product may be heated to up to 75° C., in order to complete the reaction. Temperatures in excess of 75° C. are undesired, since an undesired imidization reaction may be initiated.

3. The soluble reaction product is poured into a large volume of 1N HCl, which precipitates out a yellow solid, which is filtered, washed, and dried, to produce a fine yellow powder, soluble in NH₄OH, and tetrahydrofuran.

Analysis of the product reveals that it is a mixture of unreacted BTDA (anhydride or acid) plus BTDA-MDA and BTDA-MDA-BTDA, both in the amic acid form. It should be understood that from the standpoint of resin formulation it does not matter that the reaction product is a mixture. As long as the correct starting ratio of 2 moles of BTDA to 1 mole of MDA is used, and there is no preferential loss of any of the components, the product is suitable for resin formulation. Based on the molecular weight ratios, the preferred weight ratios, for resin formulation of a 1500 M.W. prepolymer are as follows:

1.00 gms NE-MDA + 1.29 gm BTDA-MDA amic acid mixture

For prepreg manufacture, these two components are solvent blended, using tetrahydrofuran, and that resin solution used to make products, etc. in accordance with previously defined procedures. These products can be used to make various laminated parts by primarily defined procedures.

An alternate procedure, which has certain economic advantages, is to use the amic acid mixture in the reaction solvent, without precipitation, to form a solvent blend in this procedure, the NE-MDA solid reaction product is dissolved in the amic acid mixture, and the resulting solvent blend used to produce the prepreg material. When this alternative is used, tetrahydrofuran is a preferred solvent, because of its low boiling point. However, prepreg so produced tends to be dry and nonpliable, and subject to loss of resin during handling. This problem can be overcome by adding a small amount (about 25% of the total solvent volume) of ethanol. This will result in a soft, pliable prepreg, better suited to the lay up of contoured panels.

For the solvent blend procedure the weight percent of amic acid mixture in the solvent blend must be determined. In this procedure the preferred formulation weight ratios for a 1500 MW prepolymer are as follows.

1 000 gms NE-MDA + 1.224 gms BTDA-MDA amic acid mixture

An important advantage of the nadic-methylene dianiline dimers according to the present invention is that they are used to prepare polyimide products that have significantly reduced toxicity. High pressure liquid chromatography (HPLC) analyses of standard PMR-15 and the MDA-free PMR-15 of the present invention reveal the compositional differences between the two materials. The standard PMR-15 formulation contains about 33% of free methylene dianiline, about 1.5% of nadic ester, and about 55% of the dimethyl ester of benzophenonetetra-carboxylic acid. The MDA-free PMR-15 of the present invention reveals essentially no monomeric components, MDA or trimer, since all of the monomers have been prereacted, and the products purified, if necessary, to remove any unreacted material. Since the pre-reaction procedure renders the system insoluble in the HPLC solvent, none of the components are detected by that analytical procedure. The trace of MDA revealed in the plot (not illustrated) represents less than 100 parts per million, in the total resin system, and is well below the level considered to be significant, from a toxicity standpoint. This observation has been confirmed by animal toxicity testing, which has revealed the resin to be nontoxic, non-skin irritating and non-mutagenic.

In order that those skilled in the art may better understand how the present invention may be practiced, the following examples are given by way of illustration, and not by way of limitation. All parts and percentages are by weight, unless otherwise noted.

EXAMPLE 1

Materials Summary

|  | NE + | MDA → | NE—MDA + | $CH_3OH$ + | $H_2O$ |
|---|---|---|---|---|---|
| M.W. | 196 | 198 | 344 | 32 | 18 |
| Moles | 0.8 | 1.6 | 0.8 | 0.8 | 0.8 |
| Grams | 157 | 317 | 275 | 26 | 14 |

MDA 317 gms + 120 ml $C_2H_5OH$
NE 157 gms + 200 ml $C_2H_5OH$
Deionized Water $H_2O$ 4000 ml
Concentrated HCl 500 ml
NaOH ≃ 200 gms Procedure 1. Put 317 gms MDA in reaction flask, and add 120 ml EtOH. Heat to bath temperature of 85°–90° C.
2. Suspend 157 gms NE in 200 ml EtOH, and allow solid to settle. Decant solution into addition funnel.
3. Add NE solution, at fast drop rate, to MDA-EtOH solution. Slowly distill off EtOH, as NE is added. Collect distillate, and use it to continue to dissolve balance of NE, by resuspension and decanting.
4 When addition of NE is complete (2–3 hours), reflux for 4 hours, slowly distilling off about ⅔ of the EtOH solvent.
5. Pour reaction product into beaker, and allow to cool overnight. The product will solidify, to a brown granular moist solid.
6. Divide product approximately in half, and treat each half as described below.
7. Heat 2000 ml DI $H_2O$ to about 50°–60° C., and add half of reaction product. Stir to break up clumps, and slowly pour in 250 ml CON HCl. Heat suspension to 100° C. At this point the NE.MDA.HCl and the excess MDA dihydrochloride are soluble, the $NE_2MDA$ is an insoluble suspension of very small particle size.
8. Using a heated (or preheated) suction funnel, slowly pour about ¼ of suspension into funnel, applying only slight vacuum in filter flask. Cover funnel with watch glass, to limit cool down. Apply suction only to maintain moderate filtration rate. Excessive suction will cause hot solution to boil, which cools it down too rapidly, causing crystallation in the pores of the filter, and blockage.
9. Continue hot filtration until suspension is used up.
10. Allow hot filtrate to cool overnight.
11. Filter off crystals of NE.MDA.HCl, and wash thoroughly by suspension (3 times) in water, and refiltration.
12. Suspend crystals in water, and stir in 10–15% solution of NaOH, until product is alkaline.
3. Filter off white powder, and wash 3 times with water, by resuspension and refiltration.
14. Dry solid overnight in a warm vacuum oven. Record weight and yield. Submit sample to lab for HPLC analysis.
15. The soluble fraction from Step #11 contains the excess MDA, which is recovered by addition of NaOH solution until the suspension is alkaline. Filter off, wash, dry, and store the solid MDA.

EXAMPLE 2

The procedure described above was repeated using 5-norbornene-2,3-dicarboxylic anhydride in place of the monomethyl ester of 5-norbornene-2,3-dicarboxylic acid. The only change in the procedure is that the anhydride is added slowly, as a dry powder, to the refluxing MDA-alcohol solution. This change is made because the anhydride is only slightly soluble in cold ethanol. Comparable results are obtained using the anhydride, and since it is less costly than the methyl ester, it is preferred.

The NE-MDA dimer is then reacted to produce a polyimide prepolymer. For example, to prepare a PMR-15 polyimide the NE-MDA dimer may be reacted as follows:

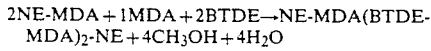
2NE-MDA+1MDA+2BTDE→NE-MDA(BTDE-MDA)$_2$-NE+4CH$_3$OH+4H$_2$O

The nadic-methylene dianiline dimers according to the present invention may be used to prepare a number of polyimide products in addition to PMR-15. An advantage of these dimers is that the toxicity of free methylene dianiline is significantly reduced or eliminated. Examples of other polyimide products which may be prepared according to the present invention using nadic-methylene dianiline dimers:

2 NE-MDA+1 BTDE-MDA-BTDE→PRODUCT

2 NE-MDA+1 BTDE-MDA+1 BTDE→PRODUCT

These two examples provide a final product essentially identical to the usual PMR system, but contain MDA only in the pre-reacted form, where its toxicity is greatly diminished.

2 NE-MDA+1 BTDA→PRODUCT

This example produces a lower molecular weight prepolymer (1000 versus 1500), hence is similar to the usual PMR formulation, but contains no unreacted MDA.

2 NE-MDA+1 DDS+2 BTDE→PRODUCT

This formation replaces one third of the MDA with a less-toxic substitute, diaminodiphenyl sulfone (DDS). The prepolymer so produced differs from the standard formulation only in that the middle of the chain contains one sulfone group (—SO$_2$—) in place of a methylene group (—CH$_2$—). The physical properties of the sulfone containing product are similar to the usual PMR formulation, but its toxicity is greatly reduced.

EXAMPLE 3

Materials Summary

| BTDA+MDA→BTDA-MDA-BTDA+BTDA-MDA+BTDA | | |
|---|---|---|
| M.W. | 322.2 | 198.3 |
| moles | 0.54 | 0.27 |
| Grams | 175.4 | 53.9 |
| MDA | 53.9 gms + 250 ml (234 g) DMAC | |
| BDTA | 175.4 gms + 496 ml (456 g) DMAC | |
| 1N HCl | 31 | |

Procedure

A. Synthesis of BTDA-MDA Amic Acid Mixture

1. Add 175.4 g of BTDA followed by 496 ml (465 g) of DMAC to a clean one liter resin kettle. Start moderate agitation. BTDA is not completely soluble and a white slurry is obtained.

2. Dissolve MDA (53.9 g) in 250 ml (234 g) of DMAC. Retain 82 ml (76.8 g) of DMAC to rinse makeup vessels and dropping funnel.

3. A slow nitrogen purge is started.

4. Add MDA solution dropwise to the stirred BTDA slurry at a rate of approximately 0.5 mil per minute over 1 hour. The slurry clears with the addition of MDA. The temperature is controlled between 15 to 18° C.

5. Run the reaction in this fashion for two hours. Then slowly raise the temperature to 50° C. and maintain the reaction with agitation in this manner for 24 hours.

6. Cool the reaction and use a vacuum to draw the orange slightly viscous liquor into a storage vessel.

7. Sample and analyze the solution for composition.

8. Obtain a solid product by rapid mechanical agitation and floccing 500 ml portions of the reactive product in 3 liters of 1 N HCl. An easily filterable and water washable particulate solid is obtained.

9. Air dry the material and then dry it at 50° C. in a circulating air oven for 24 hours. A product with a volatile content of 1-2% was obtained. Yield of product after work up is 65 to 75% of theoretical.

If the alternate procedure of using the reaction product in solution, without precipitation of the solid resin, is used, the preferred solvent is tetrahydrofuran. The alternate procedure is the same as the procedure described above, except that steps #7 and #8 are omitted.

EXAMPLE 4

(Comparative Example)

A series of experiments were carried out to determine the influence of mole ratios, MDA to NA, on the level of trimer formation. The experiments illustrate the influence of reactant mole ratios on the product mix ratio. For the reaction between methylene dianiline (MDA) and nadic anhydride (NA)

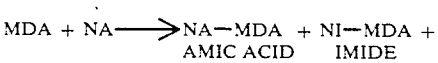
MDA + NA ⟶ NA—MDA + NI—MDA +
              AMIC ACID    IMIDE

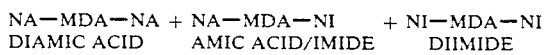
NA—MDA—NA + NA—MDA—NI + NI—MDA—NI
DIAMIC ACID   AMIC ACID/IMIDE   DIIMIDE A mole ratio range of 4-1 (MDA excess) to 0.5-1 (MDA deficiency) was investigated. The relative amounts of each component were estimated by comparison of the respective area percents under each peak. The results are recorded in FIG. 1. FIG. 1 indicates that a 1.05 to 1.00 mole ratio of MDA to NE renders a totally unacceptable trimer formation, and that to significantly suppress trimer formation at least about a 2 to 1 ratio must be reached.

EXAMPLE 5

A Toxicity and Irritation Evaluation conducted on MDA-free PMR-15 prepared according to the invention indicates a lack of oral toxicity, and skin irritation.

Ten Sprague-Dawley rats administered an oral dose of the test sample at 5 g/Kg doses. The test was prepared by adding 21.0 g powdered MDA-free PMR-15 prepared according to the invention to 42 ml corn oil (final volume, 54 ml) by heating and stirring the mixture for 30 minutes to yield a uniform (solution/suspension) at a sample concentration of 0.39 g/ml. The MDA-free PMR-15 prepared according to the invention was not acutely toxic in that the test did not induce mortality.

| Sample | Animals | Dose (g/Kg) | 14 Day Mortality Percent Total | Average Body Weight Initial | Average Body Weight Final |
| --- | --- | --- | --- | --- | --- |
| MDA-free PMR-15 | F | 5 | 0 | 218 | 240 |
|  | M | 5 | 0 | 244 | 321 |

No erythema, eschar formation, or edema formation was observed on six rabbits on which single doses of 0.5 g MDA-free PMR-15 prepared according to the invention were applied for 24 hours over one square inch of test site skin. The MDA-free PMR-15 prepared according to the invention was not considered to be a primary skin irritant.

MDA-free PMR-15 prepared according to the invention was tested for mutagenicity by applying the sample diluted 1/1 in DMSO to five strains of *S.typhimurium* according to the method by Ames et al, "Methods for Detecting Carcinogens and Mutagens with *Salmonella* Mammalian Microsome Mutagenicity Test," Mut-Res. 31, 347–364 (1975). The mutation frequency measured by reversion to histidine independence of the test bacteria was not significantly increased relative to the spontaneous reversion of controls. The results were confirmed when potential mutagenicity was evaluated in both the presence and absence of a mammalian liver s-9 activation system accounting for enzyme activation of pro-mutagens or deactivation of direct acting mutagens. The MDA-free PMR-15 prepared according to the invention is non-mutagenic.

Additional products which may be prepared according to the present invention using nadic-methylene dianiline dimers include PMR-30 and PMR-II-30 formulations, both described by R. Vanucci in *PMR Polyimide Compositions for Improved Performance at 371° C.*, published in "SAMPE Quarterly," volume 19, pages 31 to 36 (1987), incorporated herein by reference. Still other products which may be prepared according to the present invention using nadic-methylene dianiline dimers include the LARC-13 formulation, described by A. St. Clair et al., Polymer Engineering and Science, volume 22, pages 9 to 14 (1982), and the LARC-160 formulation, described by P. Young et al., in *Resins for Aerospace*, pages 479–490, American Chemical Society Symposium Series, No. 132 (1980), both of which are incorporated herein by reference.

Compared to the prior preparations of PMR polyimides, a new preblending technique provides the following advantages: longer shelf life, increased resin flow, higher glass transition temperature, increased heat resistance, reduced laminate microcracking, reduced volatile release at or near cross-linking temperature, longer room temperature shelf life and longer debulking time. The term "debulking time" refers to the debulking process. For thick parts (15-50 plies), it is common practice to layup a few plies, perhaps four, bag, and apply pressure and modest heat, generally 79°-90° C. This process compacts the layup and helps prevent the formation of wrinkles and resin rich areas. Since it is repeated several times, the initial plies are subjected to several thermal cycles, and their ability to retain their utility under these conditions is a desirable characteristic.

A laminate is a sheet material made of several different layers bonded together with laminating resins. Laminating resins are prepared according to the present invention and may be processed into useful structural components, as follows. Composite materials consist of a reinforcing agent, usually in the form of a woven fabric or continuous tape made up of fibers, which has been impregnated in a resin according to the present invention, to form a sheet or ply, referred to as a prepreg. Typical reinforcement fibers are various grades of high modulus, high strength carbon, glass, organic polymer, metallic, and the like. For the purposes of the present invention, some form of continuous carbon fiber product is preferred. However, for some applications fibers cut to short length are intermingled with the resin and used as molding compositions.

For most applications woven fabric or unidirectional tape prepreg materials are preferred. For laboratory work, the prepreg is made by dipping the fabric in a tank containing the resin in a solution. A low boiling solvent is preferred, in order to allow for rapid solvent evaporation. After dipping, the cloth is drawn between scraper bars, to squeeze out the excess resin. The product is air and/or oven dried, to the desired solvent content. An alternate to the hand dip procedure is to place the reinforcing material on a flat surface, and pour a measured amount of resin solution onto the fabric material. A scraper may be used to hand work the resin over and into the entire fabric area. The product then is air and/or oven dried to the desired degree of tack.

For large scale production of prepreg, special equipment called a coating tower is used. This equipment provides for continuous passage of the reinforcing material through one or more dip tanks, with controlled scraper rods, and heated zones, to remove excess solvent. This process is highly automated and produces high quality prepreg materials.

For some applications, a hot melt process is preferred, especially where unidirectional tapes are desired. In this process, the individual fibers are fed from a series of reels into a machine aligns them in parallel, side by side. They are fed through a series of heated rollers, along with a film of resin, cast on a supporting film by passage thru heated zones and scrapers. The cast film is pressed into the fibers while the resin is hot, and subsequent cooling produces the desired prepreg.

The prepreg so produced is rolled up and sold to processors who convert it into finished components.

Laminate Fabrication

Laminates may be prepared using a resin according to the present invention where prepreg made as outlined above is cut into the desired shape, stacked up into a multi ply configuration, and heat and pressure applied. Heating of the prepreg drives off the remaining volatile matter, and the pressure compacts and densifies the laminate. Additional heating causes the resin to cross link to an infusible solid which binds together the fiber into a structural component. These procedures are illustrative of suitable processing methods, but various alterations may be appropriate, depending on part size and configuration.

The laminating resin products of the present invention have carefully controlled molecular weight distribution and achieve high solubility in low boiling solvents, and good flow characteristics such that laminated products can be processed at pressure available in autoclaves, typically no higher than 200 psi. In addition, the solubility of the products in low boiling solvent makes it possible to coat the resin on a fabric and subsequently drive off the low boiling solvent without chemically altering the composition of the resin system.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for the preparation of a polyimide prepolymer, comprising:
   reacting a nadic compound selected from the group consisting of nadic acid, a monoester of nadic acid and nadic anhydride with a primary aromatic diamine in an amount effective to suppress nadic-diamine-nadic trimer formation and to form a product consisting essentially of a nadic-diamine dimer, and
   reacting said nadic-diamine dimer with the amic acid reaction product of a primary aromatic diamine and an aromatic compound selected from the group consisting of an aromatic dianhydride, a diester of an aromatic tetraacid, and an aromatic tetraacid, to form a polyimide prepolymer.

2. The process set forth in claim 1, including at least about 100 mole % excess of said primary aromatic diamine with respect to said nadic compound.

3. The process set forth in claim 1, wherein the mole ratio of said aromatic compound to primary aromatic diamine is between about 2:1 to 1:1.

4. The process set forth in claim 2 wherein said nadic compound is the anhydride of 5-norbornene-2,3-dicarboxylic acid.

5. The process set forth in claim 4 wherein the dimer formed by the reaction of the anhydride of 5-norbornene-2,3-dicarboxylic acid and the primary aromatic diamine is an amide.

6. The process set forth in claim 5 wherein said amide further reacts to form an imide.

7. The process set forth in claim 2 wherein said nadic compound is the monoester of 5-norbornene-2,3-dicarboxylic acid.

8. The process set forth in claim 7 wherein said nadic-diamine dimer formed by the reaction of said monoester of 5-norbornene-2,3-dicarboxylic acid and said primary aromatic diamine is an amide.

9. The process set forth in claim 8 wherein said amide further reacts to form an imide.

10. The process set forth in claim 2 wherein said nadic compound is 5-norbornene-2,3-dicarboxylic acid.

11. The process set forth in claim 10 wherein said nadic-diamine dimer formed by the reaction of 5-norbornene-2,3-dicarboxylic acid and said primary aromatic diamine is an amide.

12. The process set forth in claim 11 wherein said amide further reacts to form an imide.

13. The process set forth in claim 2 wherein said primary aromatic diamine is 4,4'-methylene dianiline.

14. The process set forth in claim 13 wherein said dimer formed by the reaction of 4,4'-methylene dianiline and said nadic compound is an amide.

15. The process set forth in claim 14 wherein said amide further reacts to form an imide.

16. The process set forth in claim 3 wherein said aromatic compound is 3,3',4,4'-benzophenonetetracarboxylic acid.

17. The process set forth in claim 16 wherein said amic acid reaction product formed by the reaction of said 3,3',4,4'-benzophenonetetracarboxylic acid and said primary aromatic diamine is an amide.

18. The process set forth in claim 3 wherein said primary aromatic diamine is 4,4'-methylene dianiline.

19. The process set forth in claim 18 wherein said amic acid reaction product formed by the reaction of said aromatic compound and 4,4'-methylene dianiline is an amide.

20. The process set forth in claim 3 wherein said aromatic compound is 3,3'4,4'-benzophenonetetracarboxylic dianhydride and said primary aromatic diamine is 4,4'-methylene dianiline.

21. The process set forth in claim 20 wherein said amic acid reaction product of said 3,3',4,4'-benzophenonetetracarboxylic dianhydride and said 4,4'-methylene dianiline is an amide.

22. A process for the preparation of a polyimide prepolymer, comprising:
   reacting a nadic compound selected from the group consisting of nadic acid, a monoester of nadic acid and nadic anhydride with a primary aromatic diamine in an amount effective to suppress nadic-diamine-nadic trimer formation and to form a product consisting essentially of a nadic-diamine dimer, and
   reacting said nadic-diamine dimer with an aromatic compound selected from the group consisting of an aromatic dianhydride, the diester of an aromatic tetraacid and an aromatic tetraacid.

23. The process set forth in claim 22 wherein at least about 100 mole % excess of said primary aromatic diamine with respect to said nadic compound is reacted with said nadic compound.

24. The process set forth in claim 22 wherein the mole ratio of said nadic-diamine dimer to said aromatic compound is approximately 2 to 1.

25. The process set forth in claim 23 wherein said nadic compound is the anhydride of 5-norbornene-2,3-dicarboxylic acid.

26. The process set forth in claim 25 wherein said nadic-diamine dimer formed by the reaction of said anhydride of 5-norbornene-2,3-dicarboxylic acid and said primary aromatic diamine is an amide.

27. The process set forth in claim 26 wherein said amide further reacts to form an imide.

28. The process set forth in claim 23 wherein said nadic compound is the monoester of 5-norbornene-2,3-dicarboxylic acid.

29. The process set forth in claim 28 wherein said nadic-diamine dimer formed by the reaction of said monoester of 5-norbornene-2,3-dicarboxylic acid and said primary aromatic diamine is an amide.

30. The process set forth in claim 29 wherein said amide further reacts to form an imide.

31. The process set forth in claim 23 wherein said nadic compound is 5-norbornene-2,3-dicarboxylic acid.

32. The process set forth in claim 31 wherein said nadic-diamine dimer formed by the reaction of said 5-norbornene-2,3-dicarboxylic acid and said primary aromatic diamine is an amide.

33. The process set forth in claim 32 wherein said amide further reacts to form an imide.

34. The process set forth in claim 23 wherein said primary aromatic diamine is 4,4'-methylene dianiline.

35. The process set forth in claim 34 wherein said nadic-diamine dimer formed by the reaction of said 4,4'-methylene dianiline and said nadic compound is an amide.

36. The process set forth in claim 35 wherein said amide further reacts to form an imide.

37. The process set forth in claim 24 wherein said aromatic compound is the dimethyl ester of 3,3',4,4'-benzophenonetetracarboxylic acid.

38. The process set forth, in claim 24 wherein said aromatic compound is the dianhydride of 3,3',4,4'-benzophenonetetracarboxylic acid.

39. The process set forth in claim 24 wherein said aromatic compound is 3,3',4,4'-benzophenonetetracarboxylic acid.

40. A process for the preparation of a polyimide prepolymer, comprising:
reacting a nadic compound selected from the group consisting of nadic acid, a monoester of nadic acid and nadic anhydride with a primary aromatic diamine in an amount effective to suppress nadic-diamine-nadic trimer formation and to form of a product consisting essentially of a nadic-diamine dimer, and
reacting said nadic-diamine dimer with a mixture of a primary aromatic diamine and an aromatic compound selected from the group consisting of an aromatic dianhydride, a diester of an aromatic tetraacid and an aromatic tetraacid, to form a polyimide prepolymer.

41. The process set forth in claim 40, wherein at least about 100 mole % excess of said primary aromatic diamine with respect to said nadic compound is reacted with said nadic compound.

42. The process set forth in claim 40, wherein the mole ratio of said aromatic compound to said primary aromatic diamine is between about 2:1 to 1:1.

43. The process set forth in claim 41 wherein said nadic compound is anhydride of 5-norbornene-2,3-dicarboxylic acid.

44. The process set forth in claim 43, wherein said nadic-diamine dimer formed by the reaction of said anhydride of 5-norbornene-2,3-dicarboxylic acid and said primary aromatic diamine is an amide.

45. The process set forth in claim 44 wherein said amide further reacts to form an imide.

46. The process set forth in claim 41 wherein said nadic compound is methyl ester of 5-norbornene-2,3-dicarboxylic acid.

47. The process set forth in claim 46, wherein said dimer formed by the reaction of said methyl ester of 5-norbornene-2,3-dicarboxylic acid and said primary aromatic diamine is an amide.

48. The process set forth in claim 47 wherein said amide further reacts to form an imide.

49. The process set forth in claim 41 wherein said nadic compound is 5-norbornene-2,3-dicarboxylic acid.

50. The process set forth in claim 49 wherein said nadic-diamine dimer formed by the reaction of said 5-norbornene-2,3-dicarboxylic acid and said primary aromatic diamine is an amide.

51. The process set forth in claim 50 wherein said amide further reacts to form an imide.

52. The process set forth in claim 41 wherein said primary aromatic diamine is 4,4'-methylene dianiline.

53. The process set forth in claim 52 wherein said nadic-diamine dimer formed by the reaction of 4,4'-methylene dianiline and said nadic compound is an amide.

54. The process set forth in claim 53 wherein said amide further reacts to form an imide.

55. The process set forth in claim 42 wherein said aromatic compound is dianhydride of 3,3,'4,4'-benzoaromatic phenonetetracarboxylic acid.

56. The process set forth in claim, 42 wherein said aromatic compound is the dimethyl ester of tetracarboxylic acid.

57. The process set forth in claim 42 wherein said aromatic compound is 3,3',4,4'-benzophenonetetracarboxylic acid.

58. The process set forth in claim 42 wherein aromatic primary diamine is 4,4'-methylene dianiline.

59. The process set forth in claim 42 wherein aromatic primary diamine is 4,4'-diaminodiphenyl sulfone.

60. A process for the preparation of a polyimide prepolymer, comprising:
reacting a nadic compound selected from the group consisting of nadic acid, a monomethyl ester of nadic acid, and nadic anhydride, with methylene dianiline in an amount sufficient to suppress nadic-methylene dianiline-nadic trimer formation to form a reaction product consisting essentially of a nadic-methylene dianiline dimer, and
reacting said dimer with an ester of benzophenone tetracarboxylic acid with methylene dianiline to form a second dimer and
reacting said first dimer and said second dimer with an ester of benzophenone tetracarboxylic acid to form a polyimide prepolymer.

61. The process set forth in claim 1, including purifying said product consisting essentially of a nadic-diamine dimer to remove nadic-methylene dianiline-nadic trimer before reacting said nadic-diamine dimer to form a polyimide prepolymer.

62. The process set forth in claim 22, including purifying said product consisting essentially of a nadic-diamine dimer to remove nadic-methylene dianiline-nadic trimer before reacting said nadic-diamine dimer to form a polyimide prepolymer.

63. The process set forth in claim 40, including purifying said product consisting essentially of a nadic-diamine dimer to remove nadic-methylene dianiline-nadic trimer before reacting said nadic-diamine dimer to form a polyimide prepolymer.

64. A polyimide prepolymer comprising a mixture of (a) a nadic compound selected from the group consisting of nadic acid, a monoester of nadic acid, and nadic anhydride, (b) a primary aromatic diamine, and (c) an aromatic compound selected from the group consisting of an aromatic dianhydride, a diester of an aromatic tetraacid, and an aromatic tetraacid, wherein said polyimide prepolymer is substantially free of unreacted primary aromatic diamine.

65. A polyimide prepolymer according to claim 64, wherein said nadic compound is the anhydride of 5-norbornene-2,3-dicarboxylic acid.

66. A polyimide prepolymer according to claim 64, wherein said nadic compound is the monoester of 5-norbornene-2,3-dicarboxylic acid.

67. A polyimide prepolymer according to claim 64, wherein said nadic compound is 5-norbornene-2,3-dicarboxylic acid.

68. A polyimide prepolymer according to claim 64, wherein said primary aromatic diamine is 4,4'-methylene dianiline.

69. A polyimide prepolymer according to claim 64, wherein said aromatic compound is 3,3',4,4'-benzophenonetetracarboxylic acid.

70. A polyimide prepolymer according to claim 64, wherein aid primary aromatic diamine is 4,4'-methylene dianiline and said aromatic compound is 3,3',4,4'-benzophenonetetracarboxylic acid.

71. A polyimide prepolymer according to claim 64, wherein said nadic compound is the monomethyl ester of 5-norbornene-2,3-dicarboxylic acid, said primary aromatic diamine is 4,4'-methylene dianiline, said aromatic compound is the dimethyl ester of 3,3',4,4'-benzophenonetetracarboxylic acid, and said polyimide prepolymer has no monomeric components.

72. A polyimide prepolymer prepared according to the process of claim 1, wherein said polyimide prepolymer is substantially free of unreacted primary aromatic diamine.

73. A polyimide prepolymer prepared according to the process of claim 2, wherein said polyimide prepolymer is substantially free of unreacted primary aromatic diamine.

74. A polyimide prepolymer prepared according to the process of claim 3, wherein said polyimide prepolymer is substantially free of unreacted primary aromatic diamine.

75. A polyimide prepolymer prepared according to the process of claim 4, wherein said polyimide prepolymer is substantially free of unreacted primary aromatic diamine.

76. A polyimide prepolymer prepared according to the process of claim 5, wherein said polyimide prepolymer is substantially free of unreacted primary aromatic diamine.

77. A polyimide prepolymer prepared according to the process of claim 6, wherein said polyimide prepolymer is substantially free of unreacted primary aromatic diamine.

78. A polyimide prepolymer prepared according to the process of claim 7, wherein said polyimide prepolymer is substantially free of unreacted primary aromatic diamine.

79. A polyimide prepolymer prepared according to the process of claim 8, wherein said polyimide prepolymer is substantially free of unreacted primary aromatic diamine.

80. A polyimide prepolymer prepared according to the process of claim 9, wherein said polyimide prepolymer is substantially free of unreacted primary aromatic diamine.

81. A polyimide prepolymer prepared according to the process of claim 10, wherein said polyimide prepolymer is substantially free of unreacted primary aromatic diamine.

82. A polyimide prepolymer prepared according to the process of claim 11, wherein said polyimide prepolymer is substantially free of unreacted primary aromatic diamine.

83. A polyimide prepolymer prepared according to the process of claim 12, wherein said polyimide prepolymer is substantially free of unreacted primary aromatic diamine.

84. A polyimide prepolymer prepared according to the process of claim 13, wherein said polyimide prepolymer is substantially free of unreacted primary aromatic diamine.

85. A polyimide prepolymer prepared according to the process of claim 14, wherein said polyimide prepolymer is substantially free of unreacted primary aromatic diamine.

86. A polyimide prepolymer prepared according to the process of claim 15, wherein said polyimide prepolymer is substantially free of unreacted primary aromatic diamine.

87. A polyimide prepolymer prepared according to the process of claim 16, wherein said polyimide prepolymer is substantially free of unreacted primary aromatic diamine.

88. A polyimide prepolymer prepared according to the process of claim 17, wherein said polyimide prepolymer is substantially free of unreacted primary aromatic diamine.

89. A polyimide prepolymer prepared according to the process of claim 18, wherein said polyimide prepolymer is substantially free of unreacted primary aromatic diamine.

90. A polyimide prepolymer prepared according to the process of claim 19, wherein said polyimide prepolymer is substantially free of unreacted primary aromatic diamine.

91. A polyimide prepolymer prepared according to the process of claim 20, wherein said polyimide prepolymer is substantially free of unreacted primary aromatic diamine.

92. A polyimide prepolymer prepared according to the process of claim 21, wherein said polyimide prepolymer is substantially free of unreacted primary aromatic diamine.

93. A polyimide prepolymer prepared according to the process of claim 22, wherein said polyimide prepolymer is substantially free of unreacted primary aromatic diamine.

94. A polyimide prepolymer prepared according to the process of claim 23, wherein said polyimide prepolymer is substantially free of unreacted primary aromatic diamine.

95. A polyimide prepolymer prepared according to the process of claim 24, wherein said polyimide prepolymer is substantially free of unreacted primary aromatic diamine.

96. A polyimide prepolymer prepared according to the process of claim 25, wherein said polyimide prepolymer is substantially free of unreacted primary aromatic diamine.

97. A polyimide prepolymer prepared according to the process of claim 26, wherein said polyimide prepolymer is substantially free of unreacted primary aromatic diamine.

98. A polyimide prepolymer prepared according to the process of claim 27, wherein said polyimide prepolymer is substantially free of unreacted primary aromatic diamine.

99. A polyimide prepolymer prepared according to the process of claim 28, wherein said polyimide prepolymer is substantially free of unreacted primary aromatic diamine.

100. A polyimide prepolymer prepared according to the process of claim 29, wherein said polyimide prepolymer is substantially free of unreacted primary aromatic diamine.

101. A polyimide prepolymer prepared according to the process of claim 30, wherein said polyimide prepolymer is substantially free of unreacted primary aromatic diamine.

102. A polyimide prepolymer prepared according to the process of claim 31, wherein said polyimide prepolymer is substantially free of unreacted primary aromatic diamine.

103. A polyimide prepolymer prepared according to the process of claim 32, wherein said polyimide prepolymer is substantially free of unreacted primary aromatic diamine.

104. A polyimide prepolymer prepared according to the process of claim 33, wherein said polyimide prepolymer is substantially free of unreacted primary aromatic diamine.

105. A polyimide prepolymer prepared according to the process of claim 34, wherein said polyimide prepolymer is substantially free of unreacted primary aromatic diamine.

106. A polyimide prepolymer prepared according to the process of claim 35, wherein said polyimide prepolymer is substantially free of unreacted primary aromatic diamine.

107. A polyimide prepolymer prepared according to the process of claim 36, wherein said polyimide prepolymer is substantially free of unreacted primary aromatic diamine.

108. A polyimide prepolymer prepared according to the process of claim 37, wherein said polyimide prepolymer is substantially free of unreacted primary aromatic diamine.

109. A polyimide prepolymer prepared according to the process of claim 38, wherein said polyimide prepolymer is substantially free of unreacted primary aromatic diamine.

110. A polyimide prepolymer prepared according to the process of claim 39, wherein said polyimide prepolymer is substantially free of unreacted primary aromatic diamine.

111. A polyimide prepolymer prepared according to the process of claim 40, wherein said polyimide prepolymer is substantially free of unreacted primary aromatic diamine.

112. A polyimide prepolymer prepared according to the process of claim 41, wherein said polyimide prepolymer is substantially free of unreacted primary aromatic diamine.

113. A polyimide prepolymer prepared according to the process of claim 42, wherein said polyimide prepolymer is substantially free of unreacted primary aromatic diamine.

114. A polyimide prepolymer prepared according to the process of claim 43, wherein said polyimide prepolymer is substantially free of unreacted primary aromatic diamine.

115. A polyimide prepolymer prepared according to the process of claim 44, wherein said polyimide prepolymer is substantially free of unreacted primary aromatic diamine.

116. A polyimide prepolymer prepared according to the process of claim 45, wherein said polyimide prepolymer is substantially free of unreacted primary aromatic diamine.

117. A polyimide prepolymer prepared according to the process of claim 46, wherein said polyimide prepolymer is substantially free of unreacted primary aromatic diamine.

118. A polyimide prepolymer prepared according to the process of claim 47, wherein said polyimide prepolymer is substantially free of unreacted primary aromatic diamine.

119. A polyimide prepolymer prepared according to the process of claim 48, wherein said polyimide prepolymer is substantially free of unreacted primary aromatic diamine.

120. A polyimide prepolymer prepared according to the process of claim 49, wherein said polyimide prepolymer is substantially free of unreacted primary aromatic diamine.

121. A polyimide prepolymer prepared according to the process of claim 50, wherein said polyimide prepolymer is substantially free of unreacted primary aromatic diamine.

122. A polyimide prepolymer prepared according to the process of claim 51, wherein said polyimide prepolymer is substantially free of unreacted primary aromatic diamine.

123. A polyimide prepolymer prepared according to the process of claim 52, wherein said polyimide prepolymer is substantially free of unreacted primary aromatic diamine.

124. A polyimide prepolymer prepared according to the process of claim 53, wherein said polyimide prepolymer is substantially free of unreacted primary aromatic diamine.

125. A polyimide prepolymer prepared according to the process of claim 54, wherein said polyimide prepolymer is substantially free of unreacted primary aromatic diamine.

126. A polyimide prepolymer prepared according to the process of claim 55, wherein said polyimide prepolymer is substantially free of unreacted primary aromatic diamine.

127. A polyimide prepolymer prepared according to the process of claim 56, wherein said polyimide prepolymer is substantially free of unreacted primary aromatic diamine.

128. A polyimide prepolymer prepared according to the process of claim 57, wherein said polyimide prepolymer is substantially free of unreacted primary aromatic diamine.

129. A polyimide prepolymer prepared according to the process of claim 58, wherein said polyimide prepolymer is substantially free of unreacted primary aromatic diamine.

130. A polyimide prepolymer prepared according to the process of claim 59, wherein said polyimide prepolymer is substantially free of unreacted primary aromatic diamine.

131. A polyimide prepolymer prepared according to the process of claim 60, wherein said polyimide prepolymer is substantially free of unreacted primary aromatic diamine.

132. A polyimide prepolymer prepared according to the process of claim 61, wherein said polyimide prepolymer is substantially free of unreacted primary aromatic diamine.

133. A polyimide prepolymer prepared according to the process of claim 62, wherein said polyimide prepolymer is substantially free of unreacted primary aromatic diamine.

134. A polyimide prepolymer prepared according to the process of claim 63, wherein said polyimide prepolymer is substantially free of unreacted primary aromatic diamine.

* * * * *

UNITED STATES PATENT AND TRADEMARK OFFICE
CERTIFICATE OF CORRECTION

PATENT NO. : 5,041,526

DATED : August 20, 1991

INVENTOR(S) : Frank J. Riel et al.

It is certified that error appears in the above-identified patent and that said Letters Patent is hereby corrected as shown below:

Column 18, line 48,

Please correct claim 64 to read as follows:

64. A polyimide prepolymer comprising a reaction product of:

(a) a nadic compound selected from the group consisting of nadic acid, a monoester of nadic acid, and nadic anhydride;

(b) a primary aromatic diamine; and (c) an aromatic compound selected from the group consisting of an aromatic dianhydride, a diester of an aromatic tetraacid, and an aromatic tetraacid, wherein said polyimide prepolymer is substantially free of unreacted primary aromatic diamine.

Signed and Sealed this

Sixth Day of October, 1992

Attest:

DOUGLAS B. COMER

*Attesting Officer*     *Acting Commissioner of Patents and Trademarks*